United States Patent [19]
Whitman

[11] Patent Number: 5,083,886
[45] Date of Patent: Jan. 28, 1992

[54] IRRIGATION SYSTEM

[76] Inventor: Robert E. Whitman, 2465 Knights Hill, Swanton, Ohio 43614

[21] Appl. No.: 419,374

[22] Filed: Oct. 10, 1989

[51] Int. Cl.⁵ .................. A01G 25/00; E02B 11/00
[52] U.S. Cl. ............................... 405/41; 239/204; 405/43
[58] Field of Search ............. 405/36, 37, 39, 40, 405/41, 43, 51; 239/204

[56] References Cited

U.S. PATENT DOCUMENTS

| | | | |
|---|---|---|---|
| 1,895,324 | 1/1933 | Heacock | 405/39 |
| 3,908,385 | 9/1975 | Daniel et al. | 405/37 |
| 4,538,377 | 9/1985 | Thornton | 405/39 X |

FOREIGN PATENT DOCUMENTS

| | | | |
|---|---|---|---|
| 650651 | 3/1979 | U.S.S.R. | 405/41 |
| 810159 | 3/1981 | U.S.S.R. | 405/41 |

Primary Examiner—David H. Corbin
Attorney, Agent, or Firm—George R. Royer

[57] ABSTRACT

The subject invention is a water retrieval system for a field irrigation system and comprises a water source, from which water is drawn for the irrigation process, and an intermediate reservoir in which water is stored, a delivery system to the field to be irrigated, with vertically extendable irrigation sprinklers strategically placed in the fields and a return irrigation system. The vertically extendable irrigation sprinkler members are controlled by remote water pressure flow or other automatically actuated means.

2 Claims, 3 Drawing Sheets

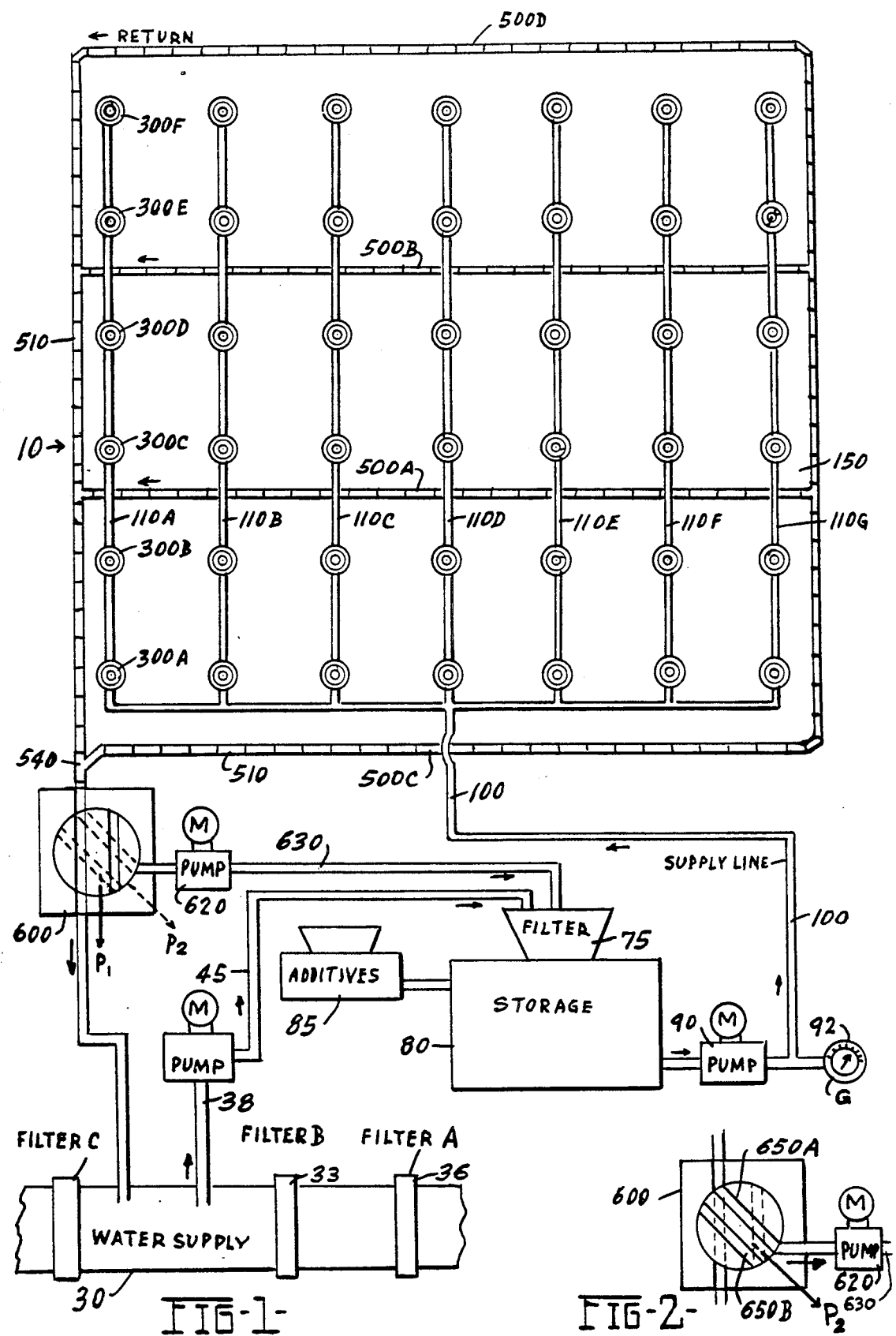

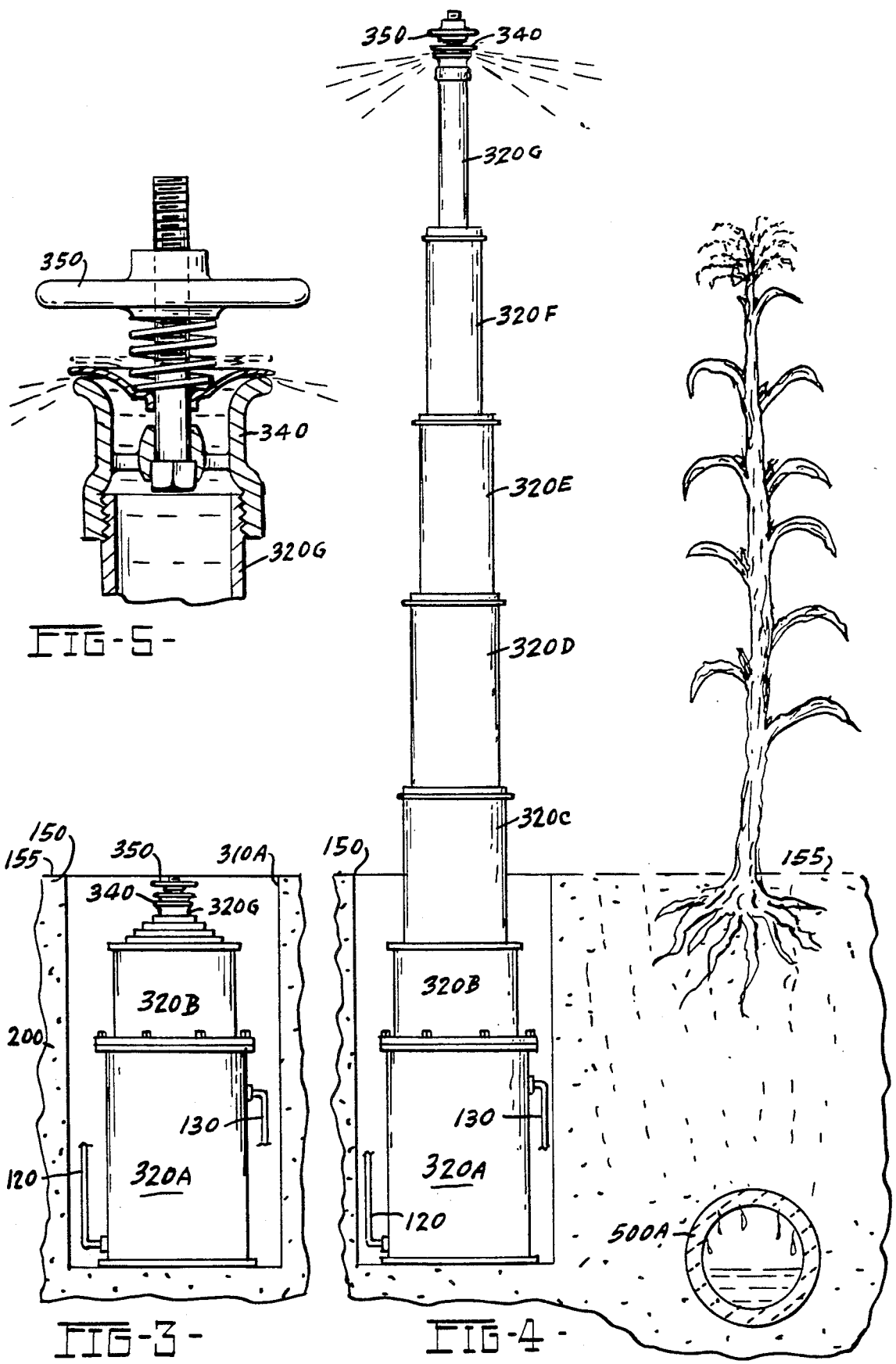

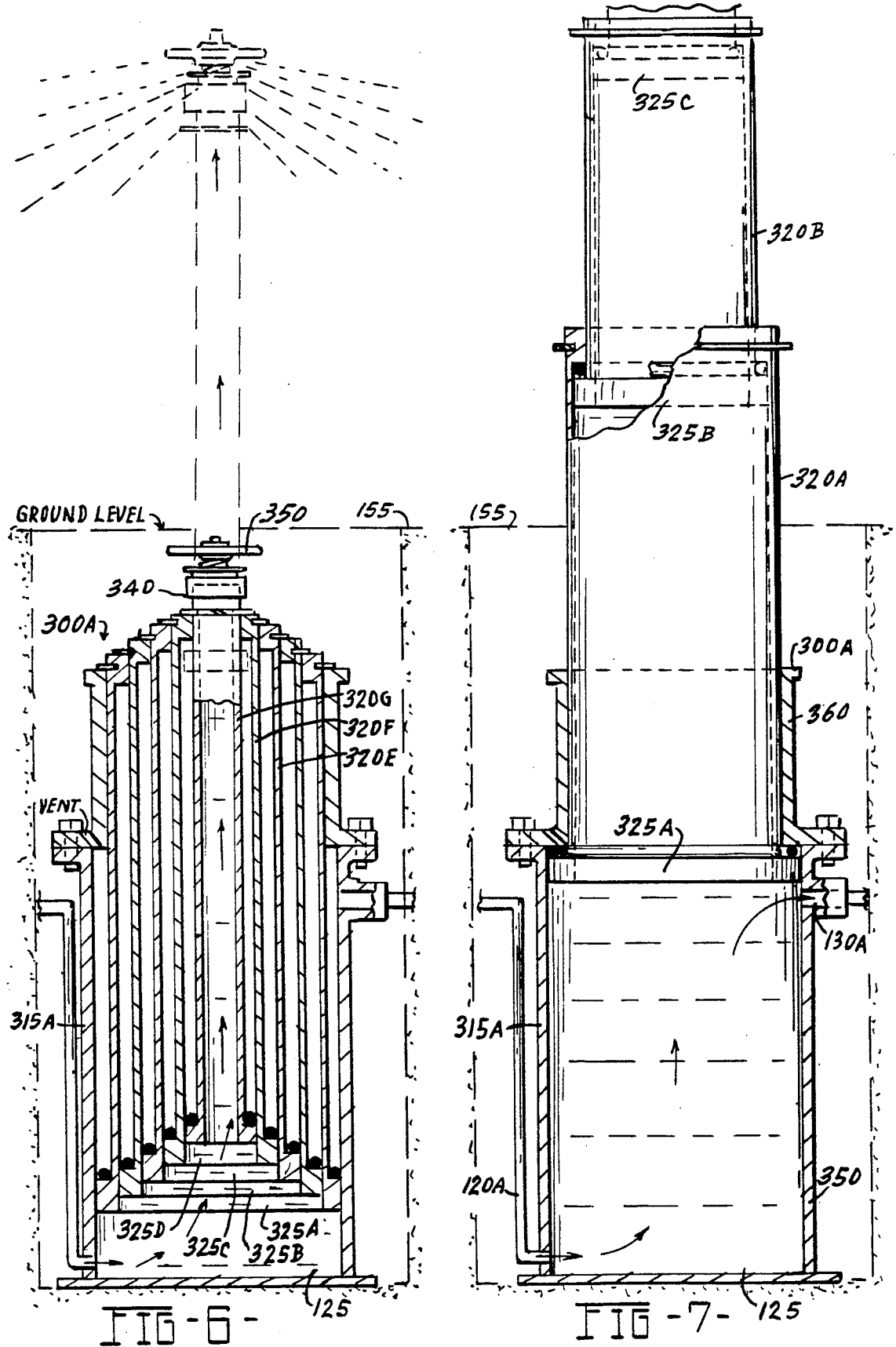

IRRIGATION SYSTEM

DISCUSSION OF PRIOR ART AND BACKGROUND OF INVENTION

The subject invention relates to an apparatus and system for irrigating fields for the facilitation of growth of crops. In this respect, it is to be indicated that the invention herein is directed to a system of recycling water in the system in order to minimize the loss of water, pesticides, and fertilizers from the field. Additionally, the system is directed to the end of minimizing the runoff of pesticides and fertilizers into streams, thus protecting the environment.

In this regard, it is the general practice in irrigation systems to draw water from a water source and delivering it to the field where it is spread over the top soil, and thence drained from the field and back into the original water source. Usually the water source comprises a stream into which the runoff water is drained. By this process of draining the runoff water into a stream, several phenomenons occur. First, the water that is run off or drained contains soil particles, pesticides and fertilizers that serve to pollute the stream, and thus causes environmental damage. Obviously, the more water that is run off, the more pollutants are caused to be thrust into the environment, causing thereby the potential for more environmental damage. This first concern is related to the second phenomenon, namely, the loss of fertilizers and pesticides to the stream and this translates into losses of relatively expensive pesticides and fertilizers that must be continuously replaced at a substantial cost. The third concern is the fact that water lost to the stream must be replaced. All these factors result in environmental damage, loss of expensive fertilizer and pesticide products, as well as the water cost and related transport expenses of moving layer quantities of water into the system.

Other numerous problems occur with water drainoff and this invention is conceived and directed to overcoming these problems, and the following objects are directed accordingly.

OBJECTS

It is an object of the subject invention to provide an improved irrigation system for a farm field;

Yet another object of the subject invention is to provide an improved irrigation system for minimizing the loss of pesticides, fertilizers, and other related products;

Still another object of the subject invention is to provide an improved system for minimizing water loss in irrigating fields;

Still another object of the subject invention is to provide an automatically activated irrigation system;

Other and further objects of the subject invention will become apparent from a reading of the following description taken in conjunction with the claims and drawings.

DESCRIPTION OF GENERAL EMBODIMENT

The subject invention is a water retrieval system for a field irrigation system and comprises a water source, from which water is drawn for the irrigation process, and an intermediate reservoir in which water is stored, a delivery system to the field to be irrigated, with vertically extendable irrigation sprinklers strategically placed in the fields and a return irrigation system. The vertically extendable irrigation sprinkler members are controlled by remote water pressure flow or other automatically actuated means.

DRAWINGS

FIG. 1 is a top elevational view of the subject invention shown in its overall arrangement in schematic fashion;

FIG. 2 is a schematic view of the return bypass valve used to shunt water either back into the irrigation system or into the water source;

FIG. 3 is a side elevational view of the water sprinkling device, in cross section, as used in the subject invention and as shown in the retracted position;

FIG. 4 is a side elevational view of the water spray device shown in FIG. 3, in the extended telescopic position and as shown in its extended position as compared to the surrounding irrigated field;

FIG. 5 is a side elevational view, in section, of the watering head of the sprinkling device shown in FIG. 3;

FIG. 6 is a side elevational view, in section, of the subject water sprinkling device, showing in detail, in its retracted position, the telescopic components thereof;

FIG. 7 is a side elevational view, in section, of the sprinkling system, shown partially as fully extended.

DESCRIPTION OF PREFERRED EMBODIMENT

In describing the preferred embodiment of the subject invention, it is to be noted that the following description shall be of one embodiment only of the subject device, and such particular description of a specific embodiment shall not be considered as limiting the scope of the invention herein. Moreover, in describing the subject invention, the following nomenclature shall be used. The word "upper" shall refer to those areas above the ground level, while the word "lower" will refer to those areas adjacent or near the ground level as appertaining to a vertically disposed device, as described.

Referring now to the drawings and particularly to FIG. 1, the subject invention, in general, is an automatically actuated and operated field irrigation system to be used in farming operations in order to minimize the loss of fertilizers and pesticides, and to further minimize any environmental damage from field runoff problems. The overall apparatus 10 comprising the system herein comprises, in general, the following main components: a main water source 30, usually a stream, a pond, or other water input source; an intermediate water storage tank 80; feed water lines 110A, 110B . . . 110G transversing a field 150 to feed irrigation water into such field; vertically disposed telescoping water sprinklers 300A, 300B . . . connected to said feed water lines 110A, 110B . . . ; to return runoff tiles 500A, 500B . . . adapted to return runoff water from field 150 to the water source; and a water shunt device 600 structured to shunt runoff water to the storage tank 80, or alternately to the water source 30. The interrelationship and specific structural aspects of these devices will be discussed more particularly below.

The water supply source 30 can be any source from which water is drawn, and piping 30 shown in FIG. 1 represents a tap from such a water source. As shown, the water source 30 can be provided with filters 33 and 36 in order to filter out various particulate matters. A pipe 38 leads from water source 30 to a first pump 40, which first pump serves to draw water from source 30, under pressure, to fill intermediate storage tank 70 by way of piping 45. Intermediate storage tank 80 can be of any size or constructional configuration, and the capacity of such tank will depend on the size and water needs of the field 150. A filter 75 can be emplaced adjacent tank 75 so that water line 45 will pass input water through such filter before entering the storage tank 80. This filter will serve to screen particulates and other undesired impurities.

An additive feed tank 85 which is disposed as an adjunt to the storage tank 80, is equipped to receive, in the upper portion, pesticides or fertilizers that pass through water line 88 from the additive tank and thence into the storage tank interior to be intermixed in appropriate proportions with water in the storage tank 80. Water in the storage tank, mixed with pesticides and fertilizers, is thence passed through second pump 90, under pressure from the action of such pump to the main line 100. Main feed water line 100 functions as the main feed water source into field 150, and leads ultimately to a series of spaced and strategically located secondary feed water line 110A, 110B . . . 1110G, shown in the drawings, as being disposed in a matrix-like pattern in the general overall area of the field 150. More specifically, each feed water line 1110A, 1110B . . . 110G is preferably located several inches under the surface of field 150 and are preferably enclosed pipes.

Integrally connected to each feed water line are a plurality of vertically disposed water sprinkler devices 300A, 300B . . . which are telescopic members adapted to project vertically upwardly from beneath the ground when sprinkling operations are to occur. In the specific regard, the water sprinkler device 300A, which is structurally representative of all such devices is seated in an underground cylindrical housing 305A, which is situated completely below ground, of the soil 200 of field 150 being open on its upper end 310A, which upper end is level with the upper surface 155 of field 150, as shown in FIGS. 3 and 4. As can be seen in the drawings, the vertical sprinkler has a lower stable housing 315A of cylindrical configuration, which housing serves as the main support structure for the sprinkling apparatus 300A, and disposed inside said housing 315A is an internal, enclosed chamber 125 adapted to receive water from tertiary water line 120 connected from feed water line 110A. As shown, tertiary feed water line 120A preferably feeds water into chamber 125 at its lowest level, and disposed at the uppermost level of chamber 125 is exit water line 130A. This latter water line feeds back into feed water line 110A to pass water onto the next succeeding water sprinkling device 300B along water line 1110A, and so forth, in similar fashion to each such sprinkler device.

The water sprinkler also comprises a series of hollow telescoping elements 320A, 320B, 320C, 320D, 320E, 320F, and 320G, of successively smaller diameter, with such members being adapted to project vertically upwardly in a telescoping manner with element 320G being the uppermost member in the extended position. Each telescoping element is preferably comprised on its bottom portion of a solid member 325A, 325B, 325C, 325D, 325E, 325F, and 325G, and such solid members may preferably be equipped with a plurality of openings to pass water therethrough after a certain minimal water pressure is impinged upwards on the undersurface.

The uppermost element has a water head 340A to eject water and a control valve handle 350A to stop water flow, as desired.

When water enters chamber 125 in water sprinkler 300A through water line 120, it eventually fills chamber 125, and causes by its upward pressure, the telescoping element 320A . . . to extend vertically upward above the ground with water passing upwardly from the chamber 125 through the interval hollow portions of the telescoping elements, and thence out of water head 340 to sprinkle water on adjacent areas of field 150.

Water from field 150 that leeches down in soil 200 is thence collected by water runoff pipe 500A, 500B . . . and transported to water shunt 600. Shunt 600 can be manipulated to direct water to water storage tank 80 through water line 630 by pump 620, or can be directed to water source 30 through line 610. The entire system can be automatically controlled electronically or by other means.

I claim:

1. A retrieval system and apparatus for retrieving and reclaiming water from a drainage and irrigation system comprising in combination the following elements:
    (a) a water source from which the water is drawn for the irrigation process;
    (b) a field in which water is drawn out from the water source for irrigation purposes to aid in growing of crops;
    (c) feed water lines in said field, said water lines being connected to said water source;
    (d) tile members in said field used to evacuate water from said field after use of such water being connected to said water source so as to drain water from said field back into said water source in said field;
    (e) water sprinkling members in said field connected to said feed water lines, said water sprinkling members being vertically disposed and adapted to telescope vertically upwardly above ground level upon receiving water from said feed water lines, said sprinkling members being telescopically vertically projectable from internal water pressure in said sprinkler system;
    (f) additive means disposed on a portion of the feed water lines to add chemicals to the water being dispersed in the field;
    (g) filtering means disposed on a portion of the feed water lines to filter said water passing therethrough;
    (h) water storage means connected to said tile members and said water source;
    (i) shunt means positioned intermediate said water source and said tile members, said shunt means being adapted to diver water from the water source into said water storage means.

2. A retrieval system and apparatus for retrieving and reclaiming water from a drainage and irrigation system comprising in combination the following elements;
    (a) a water source from which the water is drawn for the irrigation process;
    (b) a field in which water is drawn out from the water source for irrigation purposes to aid in growing of crops;
    (c) feed water lines in said field, said water line s being connected to said water source;
    (d) tile members in said field used to evacuate water from said field after use of such water being connected to said water source to as to drain water from said field back into said water source in said field;

(e) water sprinkling members in said field connected to said feed water lines, said water sprinkling members being vertically disposed and adapted to telescope vertically upwardly above ground level upon receiving water from said feed water lines, said sprinkling members being telescopically vertically projectable from internal water pressure in said sprinkler system;

(f) additive means disposed on a portion of the feed water lines to add chemicals to the water being dispersed in the field;

(g) filtering means disposed on a portion of the feed water lines to filter said water passing therethrough.

(h) water storage means connected to said tile members and said water source;

(i) shunt means positioned intermediate said water source and said tile members, said shunt means being adapted to divert water from the water source into said water storage means;

(j) pump means connected to said water source means adapted to pump water from said water supply to said feed water lines.

* * * * *